Oct. 7, 1952          H. V. TUTTON          2,613,116
TRACK-LAYING TRACTOR
Filed June 18, 1947          2 SHEETS—SHEET 1
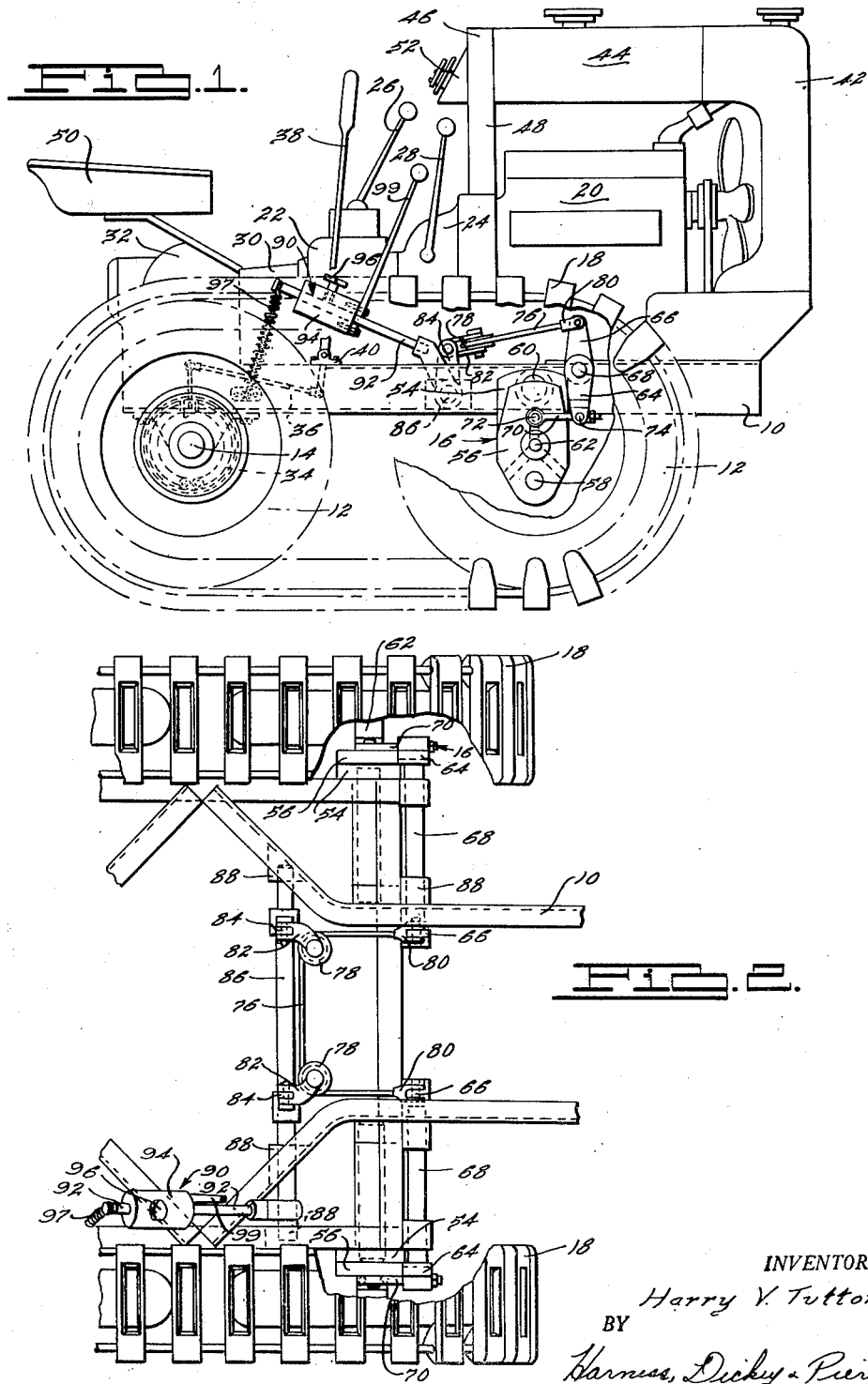
INVENTOR.
Harry V. Tutton.
BY
Harness, Dickey & Pierce.
ATTORNEYS.

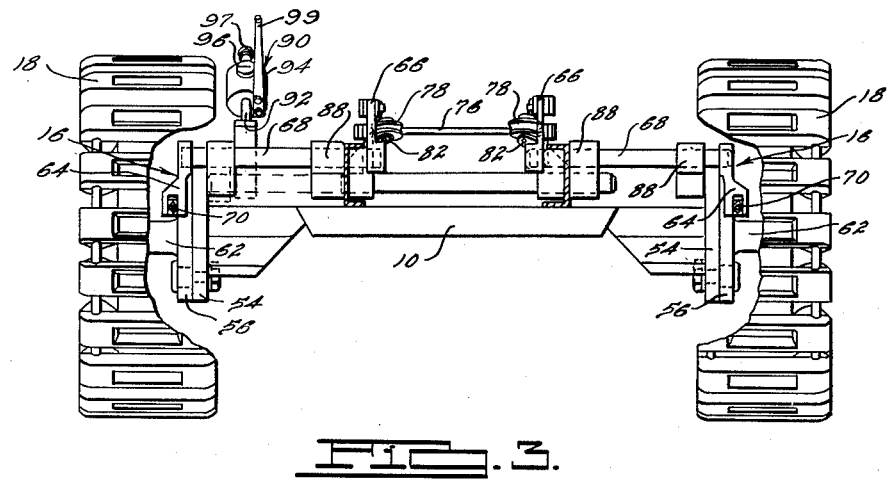

Patented Oct. 7, 1952

2,613,116

UNITED STATES PATENT OFFICE 2,613,116

TRACK-LAYING TRACTOR

Harry V. Tutton, Detroit, Mich., assignor to Sherman Products Inc., Royal Oak, Mich.

Application June 18, 1947, Serial No. 755,395

18 Claims. (Cl. 305—8)

This invention relates to track-laying tractors of the type disclosed in the copending application of Lewis B. Merrill, Serial No. 529,087, which was filed April 1, 1944, and now Patent Number 2,452,671, issued November 2, 1948, and in my copending application Serial No. 734,946 which was filed March 15, 1947.

An important object of the present invention is to provide a track-laying tractor having a set of at least two wheels at each side thereof which sets of wheels carry endless tracks and at least one wheel in each set being adjustable longitudinally of the vehicle and capable of retracting a distance sufficient to permit considerable slack to form in the endless track associated therewith.

Another object of the invention is to provide a track-laying tractor of the above mentioned character wherein a weight means is associated with the wheel mountings in such a manner as to maintain the tracks normally taut at all times.

Yet another object of the invention is to provide a track laying tractor of the above mentioned character wherein the weight means is adjustable to regulate the tension of the tracks.

A further object of the invention is to provide a track laying tractor of the above mentioned character wherein the movable wheels retract sufficiently so that the tracks can pass over and wrap around an obstruction such as a stump, log, or rock without raising all of the wheels on one side of the vehicle.

A still further object of the invention is to provide a track laying tractor of the above mentioned character wherein the wheels which support the endless tracks are uniquely mounted so that the lower runs of the tracks are never required to support the weight of the vehicle when traversing an obstruction of the type referred to above.

Still another object of the invention is to provide a track laying tractor of the above mentioned character wherein greater traction is obtained under substantially all conditions of operation than in conventional vehicles of this type.

Other objects and advantages of the invention will be apparent during the course of the following description.

In the drawings forming a part of this specification and wherein like numerals are employed to designate like parts throughout the same, Fig. 1 is a side elevational view of a track laying tractor embodying the invention, parts of the track and front wheel being broken away to show the wheel mounting which comprises one feature of the invention;

Fig. 2 is a fragmentary, top plan view of the vehicle showing the driving and operating parts removed and parts of the endless tracks broken away to illustrate more clearly the construction and operation of the wheel mountings;

Fig. 3 is a front elevational view of the vehicle as illustrated in Fig. 2;

Fig. 4 is a fragmentary side elevational view showing the position of the wheel mounting with the wheel in retracted position; and Fig. 5 is a top plan view similar to Fig. 2 but showing a modified form of the invention.

As suggested, the present invention is concerned primarily with a weight-lever system for maintaining the endless tracks normally taut at all times. In general, the tractor, itself, may be any type to which the novel wheel mounting and its adjuncts can be adapted.

The tractor here shown has a generally rectangular horizontal frame 10 and is supported by four wheels 12. A pair of wheels is provided at each side of the vehicle, and the wheels in each pair are positioned relatively close together as shown in Fig. 1. Any suitable type of wheel may be used but a conventional tractor wheel having a solid or pneumatic rubber tire is preferred. The two rear wheels 12 are mounted on a fixed axle 14, and the two front wheels are carried by a novel mounting hereinafter described in detail and designated generally by the numeral 16. An endless track 18 is trained over each pair of wheels.

The mounting 16 permits the front wheels 12 to move longitudinally of the frame 10 either individually or simultaneously for a limited distance and relative to the rear wheels 12. Provision is made for assuring rectilinear movement of the front wheels 12 at all times during such travel and for urging the front wheels away from the rear wheels to tauten the endless tracks 18. This construction has the advantage that the front wheels 12 are held in fully advanced positions during normal travel of the vehicle on level ground; however, in the event an endless track 18 passes over an obstruction such as a log, stump, or rock, the front wheel associated with such track retracts sufficiently so that the track merely wraps around the obstruction as the vehicle passes thereover.

From the foregoing it will be readily apparent that both of the wheels on one side of the tractor are never off the ground at the same time, and the weight of the vehicle is never supported entirely by the lower run portion of the track as is the case in conventional vehicles of this type. This phenomenon in conventional vehicles results in frequent breakage of the tracks. Also there is a tendency, in the case of conventional tractors, for the vehicle to roll or rock about both longitudinal and transverse axes when traversing an obstruction of the character referred to above, and this tendency is entirely eliminated or at least greatly reduced by the construction and operation of the instant invention. In addition to the above, the increased area of contact provided between the endless track and the obstruction affords considerably greater traction for the vehicle and permits the same to pass more easily over the obstruction.

The operating and control mechanism for the tractor may be conventional in construction and comprises no part of the present invention; however, a brief description is given of the mechanism here shown by way of illustration. An internal combustion engine 20 is mounted on the forward end of the frame 10, which engine drives the usual change speed transmission 22 through a conventional clutch 24. The transmission 22 is controlled by the usual hand lever 26, and the clutch 24 is actuated by the usual control lever 28. At the rearward end of the transmission 22 is a drive shaft housing 30 which carries the usual drive shaft (not shown) and the latter drives the usual differential gearing (not shown) in the housing 32. It is to be understood that the differential gearing in housing 32 has the usual driving connection with the rear wheels 12.

Steering is accomplished by braking one or the other of the rear wheels 12, and for this purpose each rear wheel is equipped with a conventional type brake mechanism designated generally by the numeral 34. In the vehicle here shown by way of illustration each of the brake mechanisms 34 is connected by a suitable linkage 36 to a hand lever 38, and the latter is mounted for movement about a horizontal pivot by a bracket 40 which is bolted on the frame 10.

A conventional radiator 42 is mounted on the frame 10 ahead of the engine 20 and is connected to the latter in the conventional manner. The usual fuel tank 44 is mounted between the upper end of radiator 42 and a dash structure 46 supported on the frame 10 by upright members 48. The usual seat 50 is provided for the operator and an instrument panel 52 carried by the dash-board structure 46 is readily accessible to the operator.

In the form of the invention shown in Figs. 1-4, the mechanism for constantly urging the front wheels 12 away from the rear wheels to maintain endless tracks 18 normally in taut condition and for controlling rearward movement of the front wheels to provide slack in the endless tracks when the vehicle traverses an obstruction comprises a weight controlled lever system for each of the front wheels and means for coordinating the two lever systems so that both of the front wheels are equally under the influence of the controlling weight means. The two lever systems for the front wheels 12 are identical and a detailed description of one therefore will suffice.

The lever system comprises a pair of arms 54 and 56 which are arranged in side by side relation and connected at the lower ends thereof by a pivot 58. The arms 54 and 56 are arranged at the outer side of the frame 10, as best shown in Fig. 1, and the inner arm 54 is attached at its upper end to the frame by a pivot 60. Thus, the inner arm 54 depends from the pivot 60 and the outer arm 56 is carried by the inner arm 54 through the medium of pivot 58 and extends upwardly from the last mentioned pivot in parallel relation with the arm 54. Preferably the upper end of the arm 56 slidably bears against the outer face of the arm 54 so as to be reinforced thereby in carrying its load. Inner arm 54 is free to swing about the pivot 60, and the outer arm 56 is independently rockable about the pivot 58. At substantially the middle of the outer arm 56 is an outwardly extending horizontal wheel spindle 62 which carries the front wheel 12. Consequently, as arms 54 and 56 rock about their respective pivots 60 and 58 the front wheel 12 associated therewith is moved back and forth longitudinally of the vehicle. This construction and arrangement of parts has the advantage that the frame 10 remains essentially level and substantially a uniform distance above the ground at all times during longitudinal travel of the movable wheels. This is true regardless of whether the wheels 12 move separately or in unison.

In order to assist in maintaining the wheel spindle 62 substantially on a rectilinear path which, when projected passes through the axes of the front and rear wheels 12 at all times during travel thereof longitudinally of the vehicle, levers 64 and 66 are fixed at opposite ends of a shaft 68 which is rotatably journaled on and transversely of the frame 10 forwardly of the two arm 54 and 56. Lever 64 depends from the shaft 68 exteriorly of frame 10 and the lower end thereof is connected to the outer arm 56 at a point above the spindle 62 by a link 70. As best shown in Fig. 2, one end of link 70 is fastened to the arm 56 by a pivot 72 and the opposite end thereof is disposed between bifurcations at the lower end of lever 64 and fastened by a transverse pivot 74. Thus, link 70 is pivoted both to arm 56 and to lever 64 to coordinate pivotal movement of the arm and lever. The other lever 66 extends upwardly from the inner end of shaft 68 and within the confines of frame 10.

In order to co-ordinate the two wheel mountings at opposite sides of the vehicle the two upstanding levers 66 are connected by a flexible cable 76. As best shown in Fig. 2, the cable 76 extends over laterally spaced sheaves or pulleys 78 which are pivotally mounted rearwardly of arms 54 and 56 and the terminal portions of the cable extend forwardly of the sheaves and are fastened to respective upstanding levers 66 by suitable clevis connections 80. The two sheaves 78 are journaled in pulley frames 82, and the latter are arranged so that the sheaves rotate about generally vertical axes. Also, it will be observed that the two pulley frames 82 are pivotally attached to the upper ends of respective upstanding levers 84, and that the pivots which connect the frames to the levers are generally horizontal. At the lower ends thereof levers 84 are keyed or otherwise fixed to a horizontal shaft 86 which in turn is journaled in suitable bearings 88 on the frame 10. Also fixed on the shaft 86 is a weight means 90 which includes an upwardly and rearwardly extending arm 92 and a weight 94 longitudinally adjustable on the arm and adapted to be fastened in a selected adjusted position by thumb screw 96.

By reason of the above construction and arrangement of parts, the single weight means 90 maintains a constant pull on the flexible cable 76 through the medium of levers 84 and sheaves 78; and the cable acts through levers 64 and 66 and link 70 to pull the two arms 56 at opposite sides of the vehicle forwardly. Arms 56, in turn, press the two front wheels 12 carried thereby against endless tracks 18. In this manner, the single weight means 90 act simultaneously on both front wheels to maintain the endless tracks 18 taut. Moreover, the force exerted against the tracks 18 by the weight means 90 can be regulated by adjusting the weight 94 longitudinally on arm 92. A spring 97 fastened to the distal end of arm 92 and to the frame 10 below such arm yieldably resists upward pivotal movement of the arm and prevents the weight 94 from being thrown forwardly by inertia, due to a sudden rearward movement of the wheels 12, sufficiently to release the tension on the tracks. In other words, it acts as a means for snubbing undesirable movement of the weights under inertia forces.

From the foregoing, it will be readily apparent that the arm 92 serves as a lever arm and the shaft 86 as a fulcrum to define a lever system which acts continuously to press the two front wheels 12 forwardly against the tracks 18 and to maintain the latter in taut condition at all times. If desired, the tension normally imposed on tracks 18 by weight means 90 can be supplemented manually by means of a generally upright handle 99 which is bolted or otherwise fastened at the lower end thereof to the weight 94. Handle 99 is particularly useful in manually applying an excess of tension on one or both the tracks under conditions where a driving wheel might otherwise slip relative to its track.

In the event one of the endless tracks 18 passes over an obstruction, the front wheel 12 associated therewith is retracted and the maximum retraction is obtained when the unsupported lower run portion of the tracks between the front and rear wheels 12 passes over the obstruction. As the front wheel 12 retracts, sufficient slack is formed in the track so that the lower run portion thereof wraps around or hugs the obstruction. In this manner, excessive stresses which normally are imposed on the track under the above conditions are relieved and substantially greater traction is achieved through the increased area of contact which obtains between the tracks and the obstruction.

As the front wheel 12 retracts, the arms 54 and 56 rock about their pivots to accommodate movement of the wheel; and, when the wheel is substantially fully retracted, the arms assume substantially the position shown in Fig. 4. As arms 54 and 56 move to accommodate the wheel 12, the levers 64 and 66 are rocked in a clockwise direction by connecting link 70 and the lever 66 in turn exerts a pull against the weight means 90 through the medium of cable 76 and its adjuncts. As a result of this action, levers 64 and 66 and link 70 guide the outer arm 56 so that the wheel spindle 62 remains in substantially the same horizontal position with respect to the frame 10 at all times during longitudinal travel of the wheel. The weight means 90 rocks upwardly and forwardly about the shaft 86 to accommodate movement of the wheel 12 while at the same time maintaining a substantially uniform forward pressure against the retracted wheel 12.

As the vehicle passes over the obstruction and upward pressure against the unsupported lower run portion of the track 18 is relieved, the weight means 90 advances the retracted front wheel 12 to its original position. During forward travel of the wheel 12 levers 64 and 66 and the connecting link 70 operate in the manner hereinabove described to maintain the wheel axle 62 substantially horizontal with respect to the frame 10.

Manifestly, if both of the endless tracks 18 encounter an obstruction simultaneously, as when the tractor traverses a log or the like, the two wheels operate in synchronism while the associated linkages and the single weight means 90 act simultaneously upon both wheel mountings to achieve the mode of operation hereinabove described.

Attention is now directed to Fig. 5 which shows a modified form of the invention. In this form of the invention the flexible cable 76 and sheaves 78 are eliminated and a separate weight means 90 is provided for each front wheel 12. Separate shafts 98 are provided at opposite sides of the vehicle in place of the single shaft 86, and a weight means 90 is fixed to each of the shafts 98. An upstanding lever 84 is fixed on the inner end of each shaft 98 and each lever 84 is connected to a respective lever 66 by a pivoted link 100.

In operation, the latter form of the invention is substantially identical to the form first described. Each weight means 90 controls the single front wheel 12 with which it is associated, and the two wheels operate entirely independently of each other. Otherwise, the operation is the same and the same advantages obtain for both forms of the invention.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a tractor vehicle, a pair of wheels at each side of the vehicle; an endless track trained over each pair of wheels with its lower run unsupported between said wheels, at least one wheel in each pair being mounted for limited movement longitudinally of the vehicle and the mounting for each of such wheels comprising a wheel supporting means, a pair of pivoted arms, one of said arms carrying said wheel supporting means and said arms collectively constructed and arranged to move the wheel supporting means longitudinally of the vehicle, and means coactive with said arms for restricting the loci of points made by the wheel-supporting means substantially to a rectilinear line; and weight means connected to the arm which carries said wheel supporting means, said weight means actuated by movement of said wheels longitudinally of the vehicle and normally urging the wheels in a direction to tauten such endless tracks and operative to resist travel of said wheels in a direction to loosen said tracks, said weight means exerting less force tending to tauten said tracks than that force required to support the vehicle solely through engagement of the unsupported lower run portions of the tracks with an object or objects over which said portions travel.

2. In a tractor vehicle, a pair of wheels at each side of the vehicle, an endless track trained over each pair of wheels with its lower run unsupported between said wheels, at least one wheel in each pair mounted for limited movement longitudinally of the vehicle and the mounting for each of such wheels comprising a toggle linkage pivoted to the vehicle and arranged with the links side by side, a wheel spindle carried by one of said links, and means coactive with the link which carries the wheel spindle for maintaining the wheel spindles in a rectilinear path at all times during longitudinal travel thereof upon pivotal movement of said toggle linkage; and weight means coactive with said toggle linkage normally urging said movable wheels in a direction to tauten said endless tracks and operative to resist travel of said movable wheels in a direction to loosen said tracks, said weight means exerting less force tending to separate the wheels on each side of the vehicle than that force required to support either side of the vehicle solely through engagement of the unsupported lower run portions of said track on the same side of said vehicle with an object over which said lower run portion travels.

3. In a tractor vehicle, a pair of wheels at each side of the vehicle, an endless track trained over each pair of wheels with its lower run unsupported between said wheels, at least one wheel in each pair mounted for limited movement longitudinally of the vehicle and the mounting for each of such wheels comprising a pair of arms, one of said arms mounted on a horizontal pivot for movement about an axis arranged transversely of the vehicle and the other of said arms pivoted to said first arm at a point remote from said horizontal pivot, wheel supporting means carried by said last mentioned arm and located intermediate said pivots, whereby movement of said arms about their pivots effects travel of said wheel supporting means longitudinally of the vehicle, and guide means connected to the arms which carry said wheel supporting means for maintaining said wheel supporting means substantially in a rectilinear path at all times during such travel; and weight means actuated by movements of the wheels longitudinally of the vehicle normally urging the same in a direction to tauten said endless tracks and operative to resist travel thereof in a direction to loosen said tracks, said weight means exerting less force tending to separate the wheels on each side of the vehicle than that force required to support either side of the vehicle solely through engagement of the unsupported lower run portions of the tracks on the same side of the vehicle with an object over which said lower run portion travels.

4. In a tractor vehicle, a pair of wheels at each side of the vehicle; an endless track trained over each pair of wheels with its lower run unsupported between said wheels; a mounting for one wheel in each pair permitting bodily movement of such wheel longitudinally of said vehicle relative to the other wheel with which it is associated, each of said mountings comprising a wheel spindle, an arm carrying said spindle, a second arm pivoted to the vehicle and pivotally attached to said first arm at one side of said wheel spindle, a lever pivoted on the vehicle adjacent said second arm, and a pivoted link connecting said lever to said first arm at the opposite side of said wheel spindle, said arms, lever and link so constructed and arranged as to permit said wheel spindle to move longitudinally of the vehicle but operative to maintain said spindle substantially in a rectilinear path at all times during such travel; and weight means connected to said lever responsive to longitudinal travel of said movable wheels for resisting travel of such wheels in a direction to loosen said tracks, said weight means exerting less force tending to separate the wheels on each side of the vehicle than that force required to support either side of the vehicle solely through engagement of the unsupported lower run portions of the tracks on the same side of said vehicle with an object over which said lower run portion travels.

5. The combination as set forth in claim 4 wherein said weight means comprises an arm rockably mounted for movement about an axis transverse to the vehicle, means connecting said arm to said lever, and a weight on said arm.

6. In a tractor vehicle, a pair of wheels at each side of the vehicle; an endless track trained over each pair of wheels with its lower run portion unsupported between said wheels; a mounting for corresponding wheels in each pair permitting bodily movement of such wheels longitudinally of the vehicle relative to the other wheels with which they are associated, each of said mountings comprising a wheel spindle, an arm carrying said spindle, a second arm pivoted to the vehicle and pivotally attached to said first arm below said wheel spindle, a lever pivoted on the vehicle adjacent said second arm, and a pivoted link connecting said lever to said first arm above said wheel spindle, said arms, lever and link so constructed and arranged as to permit the wheel spindle to move longitudinally of the vehicle but operative to maintain said spindle substantially in a rectilinear path at all times during such travel; means for co-ordinating movement of said levers at opposite sides of the vehicle; and weight means connected to said lever responsive to longitudinal travel of said movable wheels for resisting travel of such wheels in a direction to loosen said tracks, said weight means exerting less force tending to separate the wheels on each side of the vehicle than that force required to support either side of the vehicle solely through engagement of the unsupported lower run portion of the track on the same side of said vehicle with an object over which said lower run portion travels.

7. In a tractor vehicle, a pair of wheels at each side of the vehicle; an endless track trained over each pair of wheels with its lower run portion unsupported between said wheels; a mounting for one wheel in each pair, said mountings permitting bodily movement of the wheels associated therewith longitudinally of the vehicle and relative to the other of said wheels, each of said mountings comprising a wheel spindle, an arm carrying said spindle, a second arm pivoted to the vehicle and pivotally attached to said first arm below said wheel spindle, a lever pivoted on the vehicle adjacent said second arm, and a pivoted link connecting said lever to said first arm above said wheel spindle, said arms, lever and link so constructed and arranged as to permit said wheel spindle to move longitudinally of the vehicle but operative to maintain said spindle substantially in a rectilinear path at all times during such travel; and a separate weight means for each wheel mounting, each weight means connected to a respective one of said levers and said weight means being individually responsive to longitudinal travel of the movable wheels with which they are associated to resist travel of such wheels in a direction to loosen said tracks, said weight means exerting less force tending to separate the wheels on each side of the vehicle than that force required to support either side of the vehicle solely through engagement of the unsupported lower run portion of the track on the same side of said vehicle with an object over which said lower run portion travels.

8. In a tractor vehicle, a pair of wheels at each side of the vehicle; an endless track trained over each pair of wheels with its lower run unsupported between said wheels, at least one wheel in each pair being mounted for limited movement longitudinally of the vehicle; and weight means connected to and actuated by movement of said wheels normally urging the same in a direction to tauten such endless tracks and operative to resist travel of said wheels in a direction to loosen said tracks, said weight means exerting less force tending to tauten said tracks than that force required to support the vehicle solely through engagement of the unsupported lower run portions of the tracks with an object or objects over which such portions travel.

9. In a tractor vehicle, a pair of wheels at each side of the vehicle; an endless track trained over each pair of wheels with its lower run unsupported between said wheels; a mounting for one wheel in each pair permitting bodily movement of such wheel longitudinally of said vehicle relative to the other wheel with which it is associated; and weight means responsive to longitudinal travel of said movable wheels for resisting travel of such wheels in a direction to loosen said tracks, said weight means including an arm rockably mounted for movement about an axis transverse to the vehicle, means connecting said arm to said wheel mountings, and a weight on said arm, said weight means exerting less force tending to separate the wheels on each side of the vehicle than that force required to support either side of the vehicle solely through engagement on the unsupported lower run portions of the tracks on the same side of said vehicle with an object over which said lower run portion travels.

10. In a tractor vehicle, a pair of wheels at each side of the vehicle, an endless track trained over each pair of wheels with its lower run unsupported between said wheels, a mounting for one wheel in each pair permitting bodily movement of such wheel longitudinally of said vehicle relative to the other wheel with which it is associated; and weight means including an arm rockably mounted on the vehicle laterally of said wheel mountings, means connecting said arm to said wheel mountings, and a weight longitudinally adjustable on said arm, said weight means responsive to longitudinal travel of said wheel mountings for resisting travel of the same in a direction to loosen said tracks and said weight adjustable on said arm to regulate the resistance offered thereby to travel of the wheel mountings, said weight means exerting less force tending to separate the wheels on each side of the vehicle than that force required to support either side of the vehicle solely through engagement of the unsupported lower run portions of the track on the same side of said vehicle with an object over which said lower run portion travels.

11. In a tractor vehicle, a pair of wheels at each side of the vehicle; an endless track trained over each pair of wheels with its lower run portion unsupported between said wheels; a mounting for one wheel in each pair, said mountings permitting bodily movement of the wheels associated therewith longitudinally of the vehicle and relative to the other of said wheels; and a separate weight means for and connected to each wheel mounting, said weight means individually responsive to longitudinal travel of the movable wheels with which they are associated to resist travel of such wheels in a direction to loosen said tracks, said weight means exerting less force tending to separate the wheels on each side of the vehicle than that force required to support either side of the vehicle solely through engagement of the unsupported lower run portions of the track on the same side of the vehicle with an object over which said lower run portion travels.

12. In a tractor vehicle, a pair of wheels at each side of the vehicle; an endless track trained over each pair of wheels with its lower run portion unsupported between said wheels; a mounting for one wheel in each pair, said mountings permitting bodily movement of the wheels associated therewith longitudinally of the vehicle and relative to the other of said wheels; and a separate weight means for each wheel mounting, said weight means individually responsive to longitudinal travel of the wheel mountings with which they are associated to resist travel of such mountings in a direction to loosen said endless tracks, said weight means comprising arms rockably mounted at opposite sides of the vehicle, means connecting said arms to respective wheel mountings, and weight on said arms, each of said weight means exerting less force tending to separate the wheels on its respective side of the vehicle than that force required to support such side of the vehicle solely through engagement of the unsupported lower run portion of the track on the same side of said vehicle with an object over which said lower run portion travels.

13. In a tractor vehicle, a pair of wheels at each side of the vehicle; an endless track trained over each pair of wheels with its lower run unsupported between said wheels, at least one wheel in each pair being mounted for limited movement longitudinally of the vehicle; weight means connected to and actuated by movement of said wheels longitudinally of the vehicle normally urging the same in a direction to tauten such endless tracks and operative to resist travel of said wheels in a direction to loosen said tracks, said weight means exerting less force tending to tauten said tracks than that force required to support the vehicle solely through engagement of the unsupported lower-run portions of the tracks with an object or objects over which said portions travel, and means for snubbing inertia effect of the weight means upon movement of the same in a direction to relieve the tension on said tracks.

14. In a tractor vehicle, a pair of wheels at each side of the vehicle; an endless track trained over each pair of wheels with its lower run unsupported between said wheels, at least one wheel in each pair being mounted for limited movement longitudinally of the vehicle; weight means connected to and actuated by movement of said wheels longitudinally of the vehicle normally urging the same in a direction to tauten such endless tracks and operative to resist travel of said wheels in a direction to loosen said tracks, said weight means exerting less force tending to tauten said tracks than that force required to support the vehicle solely through engagement of the unsupported lower-run portions of the tracks with an object or objects over which such portions travel; and spring means co-operative with said weight means to yieldably resist movement of the latter in a direction to loosen said endless tracks.

15. In a tractor vehicle, a pair of wheels at each side of the vehicle; an endless track trained over each pair of wheels with its lower run unsupported between said wheels, at least one wheel in each pair being mounted for a limited movement longitudinally of the vehicle; weight means connected to and actuated by movement of said wheels longitudinally of the vehicle normally urging the same in a direction to tauten such endless tracks and operative to resist travel of said wheels in a direction to loosen said tracks, said weight means exerting less force tending to tauten said tracks than that force required to support the vehicle solely through engagement of the unsupported lower-run portions of the tracks with an object over which such portions travel; and manually operable means for supplementing the force exerted by said weight means against said endless tracks.

16. In a tractor vehicle, a pair of wheels at each side of the vehicle; an endless track trained over each pair of wheels with its lower run unsupported between said wheels, at least one wheel in each pair being mounted for limited movement longitudinally of the vehicle; weight means connected to and coactive with said movable wheels for pressing said movable wheels against said endless tracks whereby to impose a tension on said tracks; and additional means coactive with said track tensioning means and operable by a physical effort of the operator of the vehicle for augmenting the weight-imposed tension of either of said endless tracks.

17. In a vehicle, a frame, a pair of wheels at each side of the frame, an endless track trained over each pair of wheels, at least one wheel in each pair being mounted for limited movement longitudinally of the vehicle and a mounting for each of said wheels comprising a wheel supporting means and a pair of pivoted arms, one of said arms pivoted to the frame for swinging movement about a horizontal axis and extending downwardly from said frame the other of said arms pivoted to said one arm below said frame and a part of said other arm above the pivot which connects it to said first arm carrying said wheel supporting means, and means connected to the arms which carry said wheel supporting means normally urging said movable wheels in a direction to tauten said endless tracks and operative to yieldably resist travel thereof in a direction to loosen said tracks, whereby said frame remains essentially level and substantially a uniform distance above the ground at all times during longitudinal travel of said movable wheels.

18. In a vehicle, a frame member, a pair of wheels arranged in tandem relation and supporting said frame member, an endless track trained around said wheels, a mounting for one of said wheels permitting bodily movement thereof longitudinally of the vehicle and relative to the other of said wheels, said mounting comprising a wheel spindle carrying said movable wheel, an arm carrying said spindle, a second arm pivoted to and depending from said frame member and pivotally attached to said first arm below said wheel spindle, and means connected to said first arm normally urging said movable wheel in a direction to tauten said endless track and operative to yieldably resist travel thereof in a direction to loosen said track, whereby said frame member remains essentially level and substantially a uniform distance above the ground at all times during longitudinal travel of the movable wheel.

HARRY V. TUTTON.

REFERENCES CITED

The following references are of record in the file of this patent:

UNITED STATES PATENTS

| Number | Name | Date |
|---|---|---|
| 1,368,652 | Pennington et al. | Feb. 15, 1921 |
| 1,455,455 | Stegeman | May 15, 1923 |
| 1,831,012 | Kornbeck | Nov. 10, 1931 |
| 1,906,116 | Smythe | Apr. 25, 1933 |
| 1,981,867 | Knox et al. | Nov. 27, 1934 |
| 2,048,933 | Johnson et al. | July 28, 1936 |
| 2,314,295 | Wampfler | Mar. 16, 1943 |
| 2,452,671 | Merrill | Nov. 2, 1948 |